July 11, 1950 H. O. PETERSON 2,515,055

DIVERSITY RECEIVER

Filed May 31, 1946 3 Sheets-Sheet 1

INVENTOR
Harold O. Peterson
BY
H. S. Grover
ATTORNEY

DIVERSITY RECEIVER

Filed May 31, 1946 3 Sheets-Sheet 2

INVENTOR
Harold O. Peterson
BY H. S. Grover
ATTORNEY

INVENTOR
Harold O. Peterson
BY H. S. Grover
ATTORNEY

Patented July 11, 1950 2,515,055

UNITED STATES PATENT OFFICE 2,515,055

DIVERSITY RECEIVER

Harold O. Peterson, Riverhead, N. Y., assignor to Radio Corporation of America, a corporation of Delaware Application May 31, 1946, Serial No. 673,291

7 Claims. (Cl. 250—8)

This application concerns receivers for telegraphy signals or similar signals of low frequency or relatively slowly varying type including facsimile signals and the like. This application is in particular concerned with diversity receivers for frequency shift telegraphy signals and the like.

In frequency shift telegraphy at the transmitter wave energy is shifted in accordance with signals from a first frequency representing "Mark" to a second representing "Space" and vice versa. The first and second frequencies are separated in the frequency spectrum the desired amount depending on the use to which the system is to be put, at least an amount sufficient to permit the receiver circuits to discriminate between the "Mark" and "Space" frequencies, and provide control currents for recording purposes. The energy representing "Mark" and "Space" may be of high frequency or of intermediate frequency used to modulate high frequency oscillations or of low frequency, in which case they may be used at the transmitter to modulate higher frequency oscillations. These systems are treated in some respects at least as frequency modulation systems since currents are shifted in frequency by the signals. The mark and spacing frequencies are on continuously but are never on simultaneously during signalling. Currents or potentials representing the mark and spacing frequencies recur at the keying rate and are the low frequency or relatively slowly varying type signals referred to in the first sentence of this specification.

The general object of my invention as disclosed herein is to improve frequency shift telegraphy receivers of the diversity type.

Figure 1:
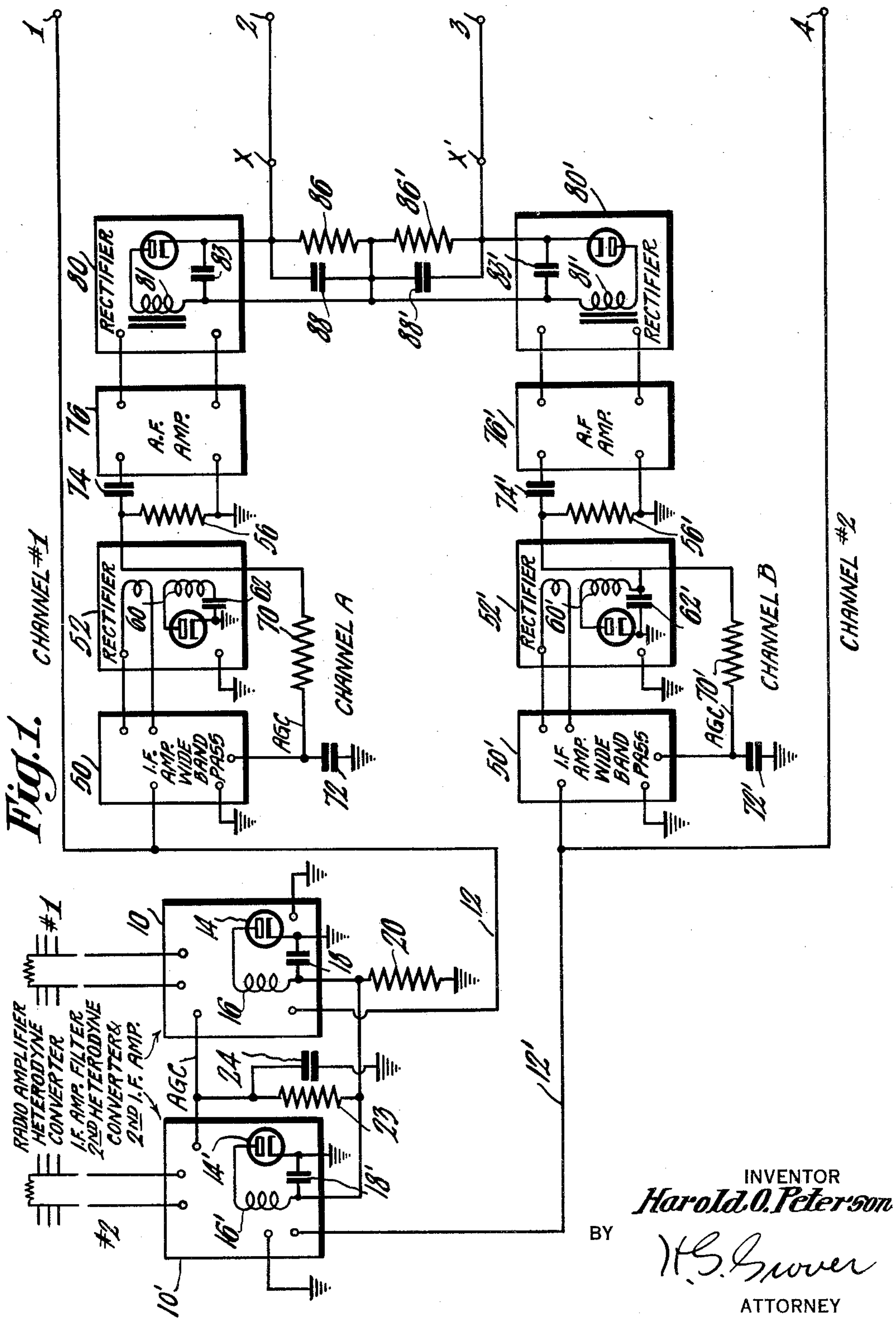
Figure 1:
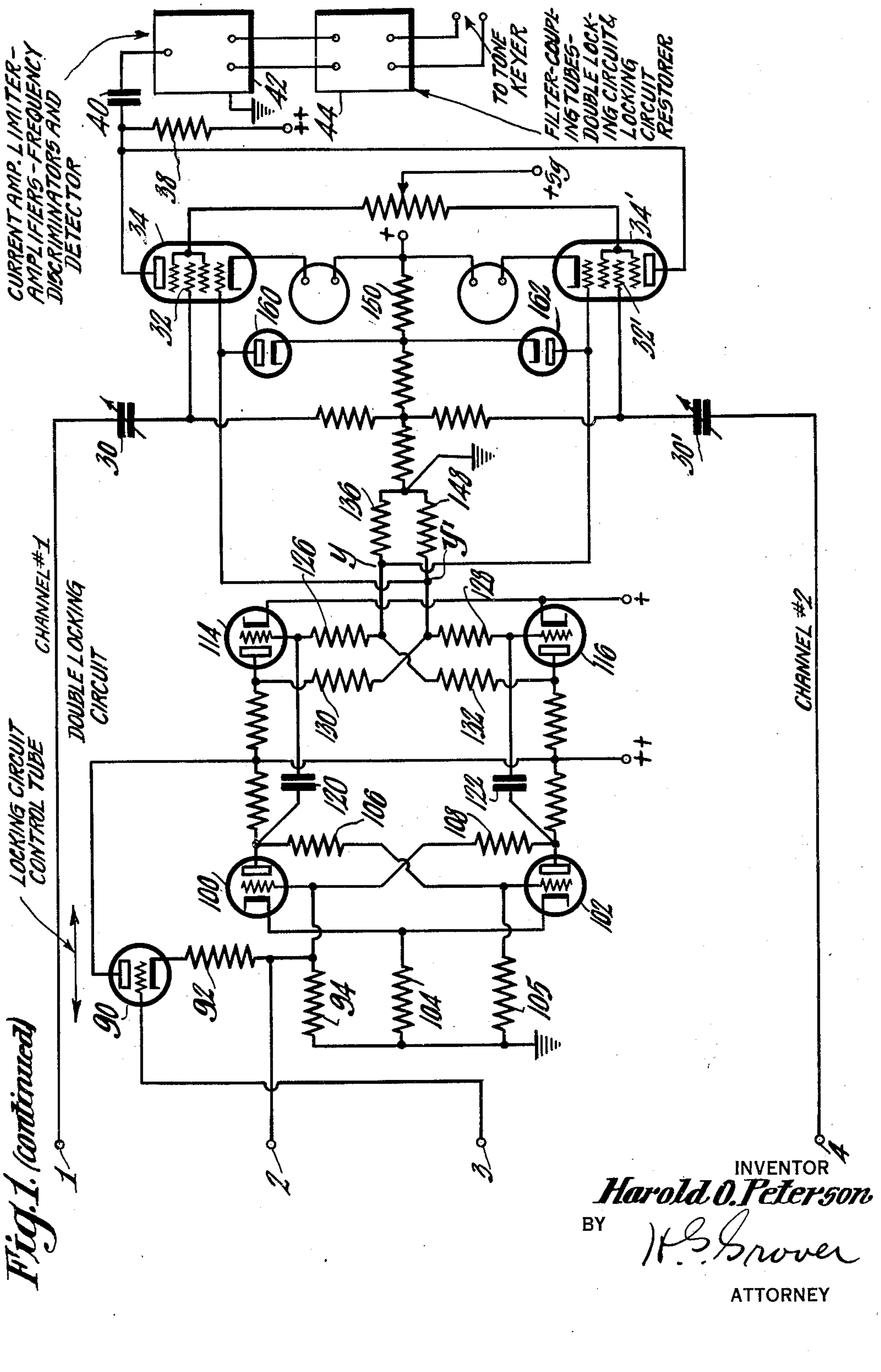

In describing my invention in detail reference will be made to the attached drawings wherein Fig. 1 illustrates by circuit element and circuit connection the essential features of a diversity receiver system arranged in accordance with my invention.

Figure 2:
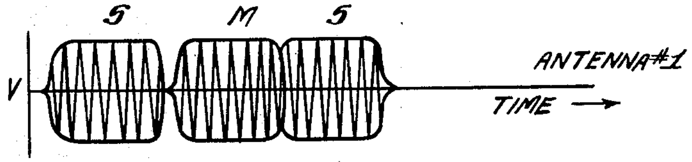
Figure 3:
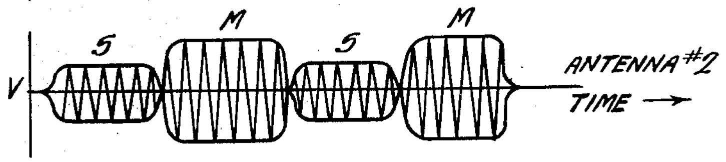
Figure 4:
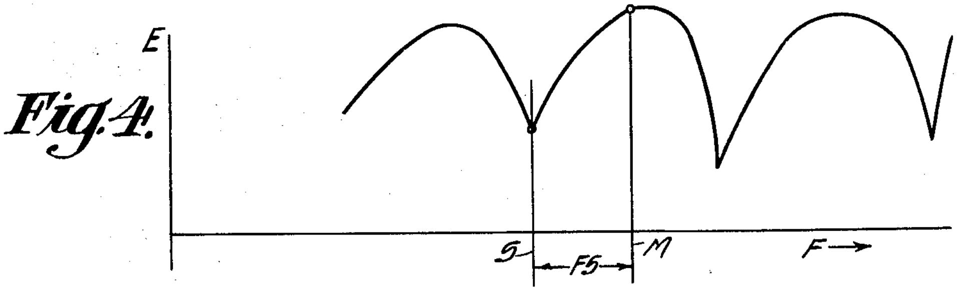

Figs. 2, 3 and 4 graphically illustrate the character of the frequency shifted energy which might be intercepted by the two antenna systems #1 and #2 of Fig. 1, and are used to explain the need and operation of my improved system.

Figure 5:
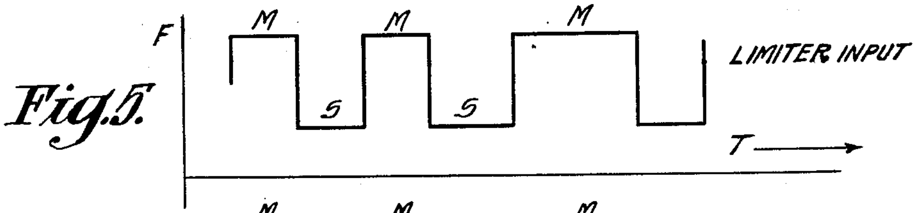
Figure 6:
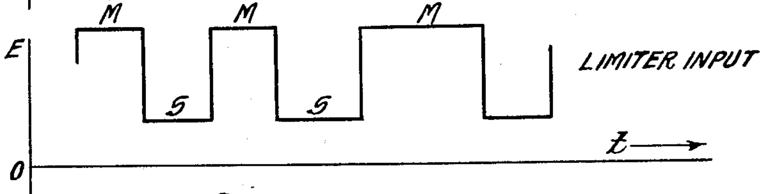
Figure 7:
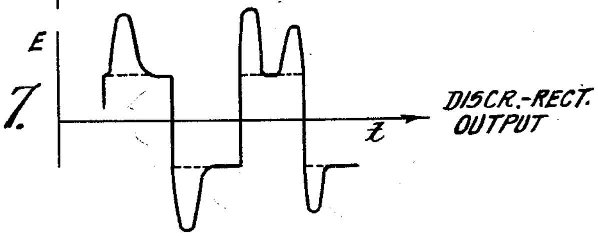

Figs. 5, 6 and 7 are curves and graphs used to illustrate the operation of my system.

When a frequency shifted telegraphy system is being operated, one frequency is used for "Mark" and another frequency is used for "Space" elements to transmit the telegraph code signals which at the receiver may be used to operate ink recorders or printing telegraph machines. These two frequencies usually differ by several hundred cycles in frequency. When such a signal is transmitted over a radio circuit the effects of multipath transmission may be such as to cause the wave energy of different frequencies to have considerably different amplitudes most of the time at the receiver. The ratio of the energies at the two frequencies is found to be varying continuously at a given receiving antenna. This variation in relative amplitude is generally known as selective fading. The selective fading at two different antennas spaced on the order of 1000 feet apart has been found to be different, so that the two frequencies may be nearly of equal magnitude at one antenna while they are of radically different magnitude at another antenna. This phonomenon is known as "Space" diversity. Then a frequency shift signal received by the spaced antennas #1 and #2 might be as represented in Figs. 2, 3 and 4, even though the two frequencies are separated by a small frequency band of the order of 1000 cycles or less. For example, the radiant energy picked up by antenna #1 during the "Space" interval might be as represented at S and the radiant energy picked up at this antenna during the "Mark" interval might be of substantially equal intensity as represented in Fig. 2 by M. On the other hand, the radiant energy pattern at the #2 antenna might be as indicated in Fig. 4 and then the radiant energy picked up on the #2 antenna might be as illustrated in Fig. 3, with the "Space" energy of much less magnitude than the marking energy. On the contrary, the marking energy might be much smaller in magnitude than the spacing energy.

It can be seen that when the two frequencies at a given antenna have considerably different amplitudes the result in the receiver is the same as if the signals were amplitude modulated. The amplitude modulation may be removed by the limiter in the receiver but there will be a phase modulation component. Since in these systems a type of frequency modulation is used, i. e., signalling is accomplished by frequency shift, this phase modulation resulting from limiting adds distortion to the frequency shift in accordance with the signalling wave. This is proven by the fact that observation shows that when the amount of frequency shift signalling is reduced the amount of distortion due to this induced phase modulation caused by limiting becomes relatively large. For example, a limiter input when the antenna #2 is supplying the receiver might be as represented in Fig. 5 where the ordinates represent frequency F and the abscissas represent time T. The input voltage to the limiter might then be as represented in Fig. 6 where the ordinates represent voltage E and the abscissas again represent time T. In diversity systems one output only is used at a time and obviously if the output picked up by the antenna #2 is used the discriminator and rectifier output might be distorted due to the phase modulation produced during the limiting action as illustrated in Fig. 7, wherein the ordinates again represent voltage and the abscissas represent time. The pips riding on the signal voltages represent distortion which is undesired.

In known diversity receiver systems for frequency shift signals such as, for example, disclosed in Peterson et al. U. S. application Serial #629,298, filed November 17, 1945, now Patent No. 2,494,309, dated January 10, 1950, and in Schock et al. U. S. application Serial #632,978, filed December 5, 1945, the energies picked up by the two or more antennas are fed through separate channels to gating tubes biased to cutoff or otherwise rendered ineffective to repeat the signal fed thereto. The signal energies are compared and a potential resulting from such comparison is used to open that gate tube supplied with the best signal. Detection may take place in each channel and the gate tubes are then excited by the demodulated signals as in both of said applications or detection may take place in a stage following the gating tubes in which case the gating tubes are excited by the keyed carrier currents as in Figure 3 of the first mentioned application. In these systems the different versions of the signals intercepted by the antenas are compared as to carrier magnitudes and that gate tube opened which is excited by the signal energy having the best carrier. The frequency shift signal having the best carrier may also be amplitude modulated in the manner described above and illustrated in Figs. 3, 4 and 7 so that the used signal may be the one having the most undesired phase modulation (in addition to signal modulation) at the limiter output. This, of course, results in a distorted signal for recording use.

A general object of my invention is to overcome this defect in known diversity receivers of frequency shift and similar signals. This object is attained in accordance with my invention by comparing the signals picked up at the two antennas as to their relative amplitude modulations, and providing by such comparison a control potential which operates to open that gate tube supplied by the antenna having the least amplitude modulation thereon.

Referring now to Fig. 1, the two antennas or radiant energy pick-up members #1 and #2 supply energy to substantially similar receiving apparatus included in rectangles 10 and 10'. This receiving apparatus in units 10 and 10' may comprise radio frequency amplifiers, heterodyning oscillators, IF amplifiers and filters, and if desired, IF heterodyne, and second IF frequency amplifiers and filters. In any event, each of the receivers supplies to the leads 12 and 12' energy of IF frequency which shifts in frequency from one frequency representing "Mark" to a second frequency representing "Space." The frequencies involved may be of the order of 50 kc.$\pm FS/2$, the frequency shift as described in said two applications referred to above. The amplifying and filtering, etc., circuits in 10 and 10' preferably include automatic gain control circuits. These gain control circuits may comprise rectifiers 14 and 14' connected as shown in alternating current and direct current circuits. The alternating current circuits may include the exciting windings 16 and 16' and the alternating current bypassing condensers 18 and 18'. The direct current circuits comprise the diode cathode return and cathode load impedance 20 which supplies the potentials which rise and fall in magnitude depending on the carrier intensity, to one or more amplifying stages in each receiver by way of a resistor 23. The delay or timing of the gain control action depends upon the size of the condenser 24 and/or of resistors 20, and 23 and is made slow enough to filter out the alternating current but not slow enough to filter out variations representing the carrier magnitude changes.

The signals from the antennas #1 and #2 are supplied by channels #1 and #2 including condensers 30 and 30' to the control grids 32 and 32' of a pair of gating tubes 34 and 34'. The gating tubes or translating electron control devices 34 and 34' and the operation thereof may be as disclosed in the said Schock et al. application. It will be assumed that one or the other of the gate tubes or gate devices is open so that the description of these channels may proceed. Say tube 34 is operative to repeat the signal supplied to the grid 32 by the condenser 30. The signal is amplified and appears across load impedance 38 and is fed from said load impedance through a coupling condenser 40 to a current amplitude limiter, amplifiers, a frequency discriminator and a detector system included in unit 42. The apparatus herein may be as disclosed in either of the channels of said above mentioned applications and will not be described in detail herein. The frequency discriminator and detector output which comprises pulse energy varying between two values, one of which may represent "Space" signal elements and the other of which may represent "Mark" signal elements is supplied to the apparatus in rectangle 44 which may include a filter, coupling tubes, a double locking circuit and locking circuit restoring means, all as described in said Schock et al. application. The output of the locking circuit in unit 44 may be used to key a tone source which in turn operates printing or other recording equipment.

The distortion described above takes place in the limiter in the apparatus of circuit 42 and distorts the output of the apparatus at 44 as described hereinbefore.

The outputs of the receivers #1 and #2 are also supplied to a signal sensing or comparing means comprising the channel A, the input of which is connected to one receiver, and the channel B, the input of which is connected to the other receiver so that these channels are excited by currents or voltages of intermediate frequency representing the two versions of the signals intercepted by antennas #1 and #2. The two channels A and B comprise wide band pass filters operating at intermediate frequency and intermediate frequency amplifiers which may be included in units 50 and 50'. The outputs of these wide band pass amplifiers which may be as disclosed in said Schock et al. application are supplied to a rectifier arrangement included in units 52 and 52'. In any event the circuits in 50 and in the preceding stages are such as to pass all important signal frequencies without frequency selection or descrimination which would result in unequal attenuation of the signal frequencies. In these rectifier or detector systems in unit 52 and 52′ the amplitude modulations as illustrated in say Fig. 3 of the drawings are detected and appear in the rectifier load impedances 56 and 56′. The rectifiers may be conventional rectifiers, and may comprise alternating current circuits including secondaries 60 and 60′ and alternating current bypass and filtering condensers 62 and 62′. The potentials across the resistances 56 and 56′ vary in accordance with magnitude of the carrier energy of intermediate frequency. These potentials are supplied thru resistors 70 and 70′, for automatic gain control purposes, to the amplifiers in 50 and 50′. Condensers 72 and 72′ remove variations of the intermediate frequency and of the modulation frequency which here is the keying frequency so that the gains in the amplifiers 50 and 50′ are controlled inversely in accordance with carrier magnitude variations. It should be noted that in the arrangement described the gain control circuits in 10 and 50, 52 assure that the output of the rectifier in 52 varies only in accordance with the amplitude modulations on the received carrier as represented in Figure 3.

The audio variations appearing across resistances 56 and 56′ are fed by coupling condensers 74 and 74′ to audio frequency amplifiers 76 and 76′ and then to audio frequency rectifiers 80 and 80′. The rectifiers 80 and 80′ may include diodes with their electrodes coupled in opposed or differential relation by output impedances 86 and 86′ shunted by condensers 88 and 88′. The rectifiers 80 and 80′ may be arranged in audio frequency circuits including transformer secondary windings 81 and 81′ and audio frequency bypass condensers 83 and 83′ with direct current circuits including the differentially connected impedances 86 and 86′.

It may be safely assumed that the signals never have equal amplitude modulations thereon of the type described hereinbefore so that across differential resistors 86 and 86′ are produced potentials of different magnitude so that there is a resultant potential for application to the control grid and cathode of the locking circuit control tube 90. If the signals were amplitude modulated in a like manner the potentials at the two cathodes, i. e., at the points X and X′ would be of like positive magnitude so that there would be no potential difference applied from these points across the grid to cathode impedance of the tube 90. Then the gate tube 34 or 34′ which has been opened will remain open until there is substantial difference in the amount of amplitude modulation on the signals in the two channels. Then the potential at the point X′ will be either plus or minus relative to the potential at X, depending on whether the signal supplied to channel A has the most or least amplitude modulation thereon.

The manner in which this control potential appearing across the resistors 86 and 86′ is used to open up that gating tube 34 or 34′ excited by the signal carrying the least amplitude modulation of the character described above will now be described briefly.

The grid of tube 90 is coupled to one terminal of the resistors 86 and 86′. The cathode of tube 90 is coupled by a resistor 92 to the other terminal of the resistors 86 and 86′. The cathode of tube 90 is also coupled to ground by resistor 94 and a point between the resistors 92 and 94 is coupled to the control grid of a tube 100 of the first stage of a double locking circuit arrangement. The cathodes of the first locking circuit tubes 100 and 102 are coupled to ground by a resistor 104, and the grid of the tube 102 is coupled to ground by a resistor 105. The voltage changes which occur across the resistor 92, here in phase with the voltage change across the resistors 86 and 86′, are applied to the grid of tube 100.

The tubes 100 and 102 are in a locking or tripping circuit of the type disclosed in Finch Patent #1,844,950. The anodes and control grids thereof are cross-coupled by resistors 106 and 108 in such a manner that when current starts to flow in one tube it is cut off in the other tube and vice versa. Tubes 114 and 116 comprise a second locking circuit with the anodes and control grids similarly connected. The control grid of tube 114 is connected to the anode of tube 100 by a condenser 120, while the control grid of tube 116 is connected to the anode of tube 102 by a condenser 122. The locking circuit comprising tubes 114 and 116 include grid resistors 126 and 128 and cross-coupling resistors 130 and 132. The arrangement is such that when the control potential on the grid of tube 100 becomes less negative this tube draws current so that its anode potential drops. This drop in anode potential is supplied to the grid of tube 102 by resistor 106 and to the grid of tube 114 by condenser 120 so that current is then cut off in tube 102 and in tube 114, and is turned on in tubes 100 and 116. The overall operation here is very fast since although the potential variations at the anodes of tubes 100 and 102 start out slowly the final flip-over is rapid and the rapidly changing pulse applied through condensers 120 and 122 flips the condition of tubes 114 and 116 rapidly, all as described in detail in said Schock et al. application.

The double locking circuits are as in said Schock et al. application, used to turn on or off one of the tubes 34 or 34′. The grid of tube 114 is connected to ground by a resistor 136 while the grid of tube 116 is connected to ground by a resistor 148. The potentials appearing between the resistors 126 and 136 and between 128 and 148 vary differentially and are applied to the first grids in the tubes 34 and 34′. These tube grids are biased by the potential drops in cathode resistor 150 and are, disregarding the potentials applied thereto by the locking circuit, biased negative to cut off. The differentially varying potentials at the grid ends of resistors 136 and 148 are applied to the first grids of tubes 34 and 34′ to bias one thereof to cut off and the other thereof to a less negative value at which that tube is made conductive. The locking circuit as is known rests in the position or condition to which it is tripped until a change in the applied control potential at X, X′ triggers it to its other position of stability.

In the said Schock et al. application referred to above, the locking tube connected with the receiver getting the signal having the best carrier intensity is opened up. In the present arrangement the signal output of the receiver wherein the received signal has the least amplitude modulation thereon is to be used and it is therefore desired to open up or make conductive the gating tube receiving the said signal. If the connections are such that when the potential at X becomes less negative, which it would when the signal in channel #1 and channel A has the most amplitude modulation, the tube 90 will draw less current and the potential on the grid of tube 100 becomes more negative to cut off current in tube 100 and make tube 114 conductive and tube 116 nonconductive, then the potential at Y' will fall while the potential at Y rises. This fall in potential at Y' will bias tube 34 to cut off while the rise in potential at Y will make tube 34' conductive. Thus tube 34' will supply output from channel #2 on which there is the least amplitude modulation. Note that the connections between the locking circuit tubes 114 and 116 and the control grids of the tubes 34 and 34' are crossed as compared to the corresponding connections in said Schock et al. application. Reversing these connections from the position shown reverses the gating action.

The gating tubes 34 and 34' may include in their grid circuits potential limiting diodes 160 and 162 serving as in said prior application to restrict the bias on the first grids of the gating tubes.

I claim:

1. In a frequency shift receiver system, means for intercepting at least two different versions of a frequency shift telegraphy signal, a translating electron control device for each version of the signal, each translating device having input electrodes excited by electrical energy representing a different one of the said versions of the signal, a common output for all of said devices, apparatus for biasing the said devices substantially to cut off so that the devices are unresponsive to the said energy exciting the same, apparatus for comparing the said intercepted versions of said signal and for producing a control voltage signifying which of the intercepted signals has the least amplitude modulation thereon, and apparatus actuated by the control voltage for overcoming the bias on the translating device excited by the energy representing the said last mentioned signal.

2. A diversity receiving system for radio frequency signals the frequency of which is shifted in accordance with signals comprising in combination, a pair of radiant energy pick-up members, an electron control device for each pick-up member excited by radio frequency energy characteristic of the frequency shifted radiant energy picked up by the corresponding member, said devices having a common output circuit, a current amplitude limiter and frequency discriminator and detector in cascade coupled to said common output circuit, apparatus for biasing said devices to cutoff, an apparatus coupled to each pick up member for generating radio frequency currents characteristic of the radiant energy picked up thereby, a detector coupled to each of said last-named apparatuses for detecting amplitude modulation on the respective radio frequency currents, a rectifier coupled to each detector for rectifying the said amplitude modulations, means connecting the two rectifiers differentially to a common circuit in which the two amplitude modulations are compared, and apparatus coupled to said last-named circuit and to said devices for overcoming the bias on that device which is excited by characteristic energy having the least amplitude modulation thereon.

3. A diversity receiving system for radio frequency signals the frequency of which is shifted in accordance with signals comprising in combination, at least two spaced radiant energy pick up members, a gate device for each pick up member excited by radio frequency energy characteristic of the frequency shifted radiant energy picked up by the corresponding member, said devices having a common output circuit, apparatus for biasing said devices to cutoff, an apparatus coupled to each pick up member for generating radio frequency currents characteristic of radiant energy picked up thereby, a detector coupled to each of said last-named apparatuses for detecting amplitude modulation on the respective radio frequency currents, a rectifier coupled to each detector for rectifying the said amplitude modulations, means connecting the two rectifiers differentially to a common circuit in which the two amplitude modulations are compared, and apparatus coupled to said last-named circuit and to said devices for producing a potential for overcoming the bias on that device which is excited by characteristic energy having the least amplitude modulation thereon.

4. In a frequency shift receiver system, means for intercepting at least two different versions of a frequency shift telegraphy signal, a gate device for each version of the signal, connections to each gate device excited by electrical energy representing a different one of said versions of the signal, a biasing circuit for each of said gates to make the devices unresponsive to the said energy exciting the same, apparatus for generating alternating current characteristic of each version of said signal, a detector and rectifier in cascade in the order given coupled to each of said last named apparatus, an output circuit, including resistors wherein rectified currents oppose, coupled to said rectifiers for producing a control voltage which is of a magnitude depending on which of the intercepted signals has the least amplitude modulation, and a control circuit actuated by the control voltage and differentially coupled to the gate devices for making that gate device excited by the energy representing the said signal having the least modulation effective to amplify the said energy.

5. In a frequency shift signalling system in combination, a pair of radiant energy pick up members, a tube valve for each pick up member excited by energy characteristic of the radiant energy picked up by the corresponding member, a common output circuit for said valves, an amplifier including automatic gain control means coupled to each of said pick up members, a detector and a rectifier in cascade for each amplifier, a wide band coupling between each rectifier and its amplifier, a load circuit for each rectifier including resistors wherein the outputs of said rectifiers are opposed to derive a potential the magnitude of which depends upon which rectifier has the weakest output, and means actuated by said potential for overcoming the bias on said valve connected with that pick up device receiving the signal with the least amplitude modulation thereon.

6. In apparatus for selecting that version of several versions of a signal, represented by currents the frequencies of which are modulated by signals and the amplitudes of which may vary at random, which has the least amplitude variation, a detector for the current of each version of said signal, a wide bandpass coupling for each detector for impressing the current versions on the respective detectors, a rectifier coupled to each detector for rectifying the detected currents, apparatus for comparing the intensities of the rectified currents, and apparatus coupled with said last named apparatus and actuated by the resultant of the compared currents for selecting and putting to use that version of the signal having the least amplitude variation.

7. A diversity receiving system for frequency shift telegraphy comprising, in combination, at least two spaced radiant energy pickup members, a gate device for each pickup member excited by energy characteristic of the radiant energy picked up by the corresponding member, said devices having a common output circuit, means for biasing said devices to cutoff, an amplifier with automatic gain control connections coupled to each pickup member, an amplitude modulation detector coupled to each amplifier, an amplitude modulation rectifier coupled to each detector, said rectifiers being differentially connected to a common impedance, and a locking circuit coupled to said common impedance and to said devices to control the biases thereon.

HAROLD O. PETERSON.

REFERENCES CITED

The following references are of record in the file of this patent:

UNITED STATES PATENTS

| Number | Name | Date |
|---|---|---|
| 2,004,107 | Goldsmith | June 11, 1935 |
| 2,089,409 | Ohl | Aug. 10, 1937 |
| 2,249,425 | Hansell | July 15, 1941 |
| 2,253,832 | Whitaker | Aug. 26, 1941 |
| 2,253,867 | Peterson | Aug. 26, 1941 |
| 2,282,526 | Moore | May 12, 1942 |
| 2,290,992 | Peterson | July 28, 1942 |
| 2,333,335 | Peterson | Nov. 2, 1943 |
| 2,384,456 | Davey | Sept. 11, 1945 |
| 2,388,052 | Hansell | Oct. 30, 1945 |
| 2,414,111 | Lyons | Jan. 14, 1947 |
| 2,420,868 | Crosby | May 20, 1947 |
| 2,441,661 | Crosby | May 18, 1948 |